(12) United States Patent
Blumentritt et al.

(10) Patent No.: US 9,346,045 B2
(45) Date of Patent: May 24, 2016

(54) ELECTRICALLY CONDUCTIVE PIPETTE TIP

(75) Inventors: Michael Blumentritt, Hamburg (DE);
Nico Gülzow, Hamburg (DE); Thomas Reimann, Geesthacht (DE); Christian Ziegmann, Ahrensburg (DE); Matthias Haak, Oldenburg (DE)

(73) Assignee: EPPENDORF AG, Hamburg (DE)

( * ) Notice: Subject to any disclaimer, the term of this patent is extended or adjusted under 35 U.S.C. 154(b) by 925 days.

(21) Appl. No.: 13/502,935

(22) PCT Filed: Sep. 25, 2010

(86) PCT No.: PCT/EP2010/005878
§ 371 (c)(1),
(2), (4) Date: Jun. 4, 2012

(87) PCT Pub. No.: WO2011/047771
PCT Pub. Date: Apr. 28, 2011

(65) Prior Publication Data
US 2013/0136672 A1    May 30, 2013

(30) Foreign Application Priority Data
Oct. 19, 2009 (DE) .......... 10 2009 049 783

(51) Int. Cl.
*B01L 3/02* (2006.01)
*G01F 23/02* (2006.01)
*G01F 23/26* (2006.01)

(52) U.S. Cl.
CPC .............. *B01L 3/021* (2013.01); *B01L 3/0275* (2013.01); *G01F 23/02* (2013.01); *G01F 23/268* (2013.01); *B01L 2300/0645* (2013.01); *B01L 2300/0858* (2013.01); *B01L 2300/168* (2013.01)

(58) Field of Classification Search
CPC ......... B01L 3/02; B01L 3/021; B01L 3/0217; B01L 3/0275
USPC .................................. 422/517, 518, 524, 525
See application file for complete search history.

(56) References Cited

U.S. PATENT DOCUMENTS

| | | | |
|---|---|---|---|
| 5,045,286 A | 9/1991 | Kitajima et al. | |
| 5,660,797 A | 8/1997 | Järvimäki | |
| 5,958,203 A * | 9/1999 | Parce et al. | 204/451 |
| 6,551,558 B1 | 4/2003 | Mann et al. | |
| 2001/0047692 A1 | 12/2001 | Lipscomb et al. | |
| 2003/0141392 A1 | 7/2003 | Nilsson et al. | |
| 2005/0064578 A1 | 3/2005 | Muller-Hartmann et al. | |
| 2008/0193995 A1* | 8/2008 | Tajima | 435/174 |
| 2010/0119416 A1* | 5/2010 | Tajima | 422/102 |

FOREIGN PATENT DOCUMENTS

| | | |
|---|---|---|
| DE | 39 05 622 A1 | 8/1989 |
| DE | 39 05 622 Al | 8/1989 |
| DE | 44 02 654 A1 | 8/1995 |

(Continued)

*Primary Examiner* — Jan Ludlow
(74) *Attorney, Agent, or Firm* — Vidas, Arrett & Steinkraus, P.A.

(57) ABSTRACT

An electrically conductive pipette tip having an elongated tubular body that has a bottom opening at the bottom end for the passage of liquid, and a top opening at the top end for the passage of air, and a passageway between the bottom opening and the top opening, wherein the body has at least one electrically-conductive region extending from the bottom opening to the top opening, and at least one transparent region consisting of plastic that extends from the passageway to the outside of the body.

20 Claims, 5 Drawing Sheets

(56) References Cited

FOREIGN PATENT DOCUMENTS

| EP | 0 849 584 B1 | 6/1998 |
| EP | 0 849 584 B1 | 7/2002 |
| EP | 1 607 747 A2 | 12/2005 |
| WO | 98/58251 A1 | 12/1998 |
| WO | 03/057819 A1 | 7/2003 |
| WO | 2008/051169 A1 | 5/2008 |
| WO | 2009/045343 A1 | 4/2009 |

* cited by examiner

ELECTRICALLY CONDUCTIVE PIPETTE TIP

CROSS-REFERENCE TO RELATED APPLICATIONS

Not applicable

STATEMENT REGARDING FEDERALLY SPONSORED RESEARCH

Not applicable

BACKGROUND OF THE INVENTION

The invention relates to an electrically conductive pipette tip.

Pipette tips are used together with pipettes for dosing liquids. Pipette tips have an elongated tubular body having a bottom opening at the bottom end for the passage of fluid, and a top opening at the top end for the passage of air, and a passageway between the bottom opening and top opening. Pipette tips are releasably connected to a pipette. To accomplish this, the top opening is conventionally clamped to a mounting shaft at the bottom end of the pipette, or the top end is clamped in a blind hole in the bottom end of the pipette. The bottom end of the mounting shaft, or the blind hole in the top end, has a passage for air that is connected via a connecting channel to a displacement unit for air. The displacement unit is generally designed as a piston/cylinder unit.

By means of the displacement unit, an air column is displaced to draw liquid into the pipette tip clamped onto the mounting shaft or clamped in the blind hole, and to eject it therefrom. If the bottom opening of the pipette tip is dipped into a liquid, the aspiration stroke of the displacement unit displaces the air column away from the bottom opening, and liquid is drawn into the pipette tip. By means of the dispensing stroke of the displacement unit, the air column is displaced toward the bottom opening, and liquid is ejected out of the bottom opening of the pipette tip. The amount of drawn and released liquid depends on the stroke of the displacement unit. Fixed volume pipettes are known with an unchangeable stroke, and variable pipettes are known with an adjustable stroke.

The displacement unit can be operated manually or with a motor. In addition, the pipette can be handheld and/or operated in a stationary manner. In particular, the pipette can be integrated in a dosing station or workstation.

Pipettes for single use are made of plastic, especially polypropylene.

During the aspiration stroke, the pipette tip needs to remain permanently immersed in liquid to prevent incorrect dosage from the aspiration of air. To determine whether or not a pipette tip is immersed in liquid, there are pipette tips made of electrically-conductive plastic such as pipette tips of the LiHa Disposable Tips series (TECAN AG, Männedorf, Switzerland).

For the use of electrically conductive pipette tips, there are pipettes with an electronic device that contact a mounted pipette tip and, by measuring capacitance, determine whether the pipette tip is immersed in liquid. Frequently, pipettes in automatic dosing stations or workstations are equipped with such a device. However, in principle, also other stationary or handheld pipettes can be correspondingly equipped.

Conventionally, electrically conductive pipette tips are made of an electrically conductive polypropylene compound with conductive carbon black. Consequently, electrically conductive pipette tips are black and opaque. Therefore the user cannot visually check during use if the pipette tip contains liquid or not. In addition, the cost of electrically conductive pipette tips is comparatively high since a carbon black component has to be processed.

A liquid transfer device is known from U.S. Pat. No. 6,551,558 B1 with cannulas consisting of concentric tubes made of metal or conductive plastic with insulation therebetween for detecting immersion in liquid. The tubes made of metal or conductive plastic are opaque.

A couvette is known from US 2005/0064578 A1 that has electrodes in facing walls which form a capacitor for electroporation. The couvette is produced in a two-component injection-molding procedure.

U.S. Pat. No. 5,660,797 describes a pipette tip consisting of different materials. In particular, the inside of a collar can consist of a material that is softer than the plastic of the remaining pipette tip to improve the seal when the top edge of the pipette tip sits tightly on a pipette in a friction lock.

EP 1 607 747 A2 describes a pipette tip that has two electrically conductive areas on the outside that form a capacitor for capacitively measuring the liquid level. The capacitance of the capacitor changes with the amount of drawn liquid.

DE 44 02 654 A1 discloses a dispenser with an electrode consisting of a conductive paint applied by screen printing.

U.S. Pat. No. 5,045,286 describes a device for aspirating a certain amount of liquid that has two electrodes which are contacted by electrically conductive areas of a seat that can be pressed into their top opening. The device is created by injection molding.

Against this background, an objective of the invention is to provide an electrically conductive pipette tip with improved application characteristics. In particular, it is the objective of the invention to provide an electrically conductive tip that allows the level of the liquid to be visually inspected.

BRIEF SUMMARY OF THE INVENTION

An electrically conductive pipette tip has an elongated, tubular body that has a bottom opening at the bottom end for the passage of liquid, and a top opening at the top end for the passage of air, and a passageway between the bottom opening and top opening, and is characterized in that the body has a continuous, electrically-conductive region extending in the longitudinal direction of the tubular body consisting of an electrically conductive first plastic component and at least one transparent region consisting of a second plastic component that extends from the passageway to the outside of the body, and the body is produced in a multi-component injection molding process.

The conductivity of the pipette tip according to the invention is ensured in that its body has at least one continuous, electrically-conductive region consisting of a first plastic component extending in the lengthwise direction of the tubular body. Consequently, an electrical current can flow from the immersed, bottom end to the top end of the electrically-conductive region of the pipette tip that can be connected to a pipette. In addition, the pipette tip has at least one region consisting of a transparent, second plastic component that extends from the passageway to the outside of the body. This allows the user to visually check whether or not the pipette tip is filled with liquid. If necessary, the level can be visually inspected. In addition, the pipette tip according to the invention can be manufactured more economically than conventional electrically conductive pipette tips since it has at least one transparent region consisting of plastic that can be designed without electrically conductive material.

In particular, polymers such as polypropylene with a conductive filler (such as conductive carbon black, carbon fibers, carbon nanotubes, metal powder or metal fibers, low melting alloys) or intrinsically conductive polymers (such as polyaniline, polythiophene or polypyrrol) can be used as the electrically-conductive plastic components. In particular, polyolefins such as polypropyls or polyethylenes can be used as the transparent plastic components. The two plastic components preferably contain the same plastic which promotes a close, firm bond between the two plastic components.

An electrically conductive polypropylene is also preferably used for the electrically-conductive region, and a natural-colored polypropylene is used for the transparent region.

The pipette tip manufactured in a multi-component injection molding process combines the advantages of plastics used for electrically-conductive and non-electrically-conductive pipette tips. Conventional procedures can be used to manufacture the pipette tip in a multicomponent component injection molding process. A two-component injection molding process is preferably used.

The multi-component injection molding process can also be performed in a variety of ways. In the core withdrawal process, an additional cavity is created after the injection and hardening of the first plastic component by withdrawing one or more elements of a molding cavity, and the second plastic component is injected into it while the mold remains closed.

With the transfer method, the first plastic component is injected and hardens and is then inserted in a new cavity while the mold is open, and the cavity has corresponding recesses for the second plastic component. This can be done using a handling system, wherein the second cavity can lie in the same mold or even in a separate mold on a second machine.

An intermediate solution is transference in index plate, turntable or stack-turning molds in which the initial injection molding part remains either on the core or in the molding cavity of one half of the mold and, when the mold is opened, is transferred into a second cavity by turning a mold section. For this solution, the initial injection molded part on the pin needs to be held together.

An electrically conductive pipette tip has an elongated, tubular body that has a bottom opening at the bottom end for the passage of liquid, and a top opening at the top end for the passage of air, and a passageway between the bottom opening and top opening, and is characterized in that a plurality of printings consisting of electrically conductive material are arranged on the body and extend in the longitudinal direction of the body and are spaced from each other in the peripheral direction of the body, and the body has transparent regions consisting of plastic between the printings that extend from the passageway to the outside of the body.

With this pipette tip, the conductivity is ensured by the printings consisting of electrically conductive material. Conductive paints can be used as the printing materials that, for example, are used in the production of transponder antennas. These can be conductive paints that contain conductive particles of silver, copper, graphite, carbon black or intrinsically conductive polymers (such as polyaniline, polythiophene or polypyrrol) in a matrix for example consisting of a solvent. Given the plurality of printings, the contacting of the liquid or a pipette can be achieved independent of the alignment of the pipette tip relative to the fluid surface or pipette. Furthermore, functional reliability is increased since at least one other printing remains a functional electrically-conductive region when only one printing is damaged. Furthermore, the printings can be at least partially applied in the form of graduation and/or lettering and/or a barcode and/or another machine-readable code. When applied in the form of graduation, the level can be evaluated. An application in the form of lettering can for example contain the product name, maximum volume of the pipette tip, information on whether the pipette tip is designed with or without a filter, instructions for use, and instructions on how to specially handle the surface of the pipette tip. The machine-readable code can for example be a barcode and can be readable and identifiable by an automatic dosing device. With this pipette tip as well, the regions of transparent plastic can allow the level to be visually checked. In addition, this pipette is also more economical than conventional electrically conductive pipette tips since it can be manufactured with less electrically conductive material, and the additional effort to identify the product, etc. is unnecessary.

The pipette tip according to the invention can be manufactured from a transparent plastic in an injection molding process. In particular, it can be manufactured from a polyolefin such as polypropylene or polyethylene. The pipette tip is then provided with the printings.

The printings can be applied by rolling the pipette tips between a printing form and a printing cylinder, wherein its axes are aligned parallel to the axes of the printing form and printing cylinder. Pipette tips with a substantially conical contour or other contour that deviates from a cylindrical shape can be manufactured by means of angled printing cylinders or profiled printing cylinders. The printing cylinders can also have a certain degree of elasticity so that parallel printing cylinders can be considered even though the contour of the pipette tip deviates from that of a cylinder.

The electrically conductive pipette tip has an elongated tubular body that has a bottom opening at the bottom end for the passage of liquid, and a top opening at the top end for the passage of air, and a passageway between the bottom opening and top opening, and is characterized by a body consisting of transparent plastic and at least one molded body consisting of electrically conductive material connected thereto.

With this pipette tip, electrical conductivity is achieved by the molded body consisting of electrically conductive material. This is for example a helical spring consisting of conductive spring steel or a strip or wire section made of copper or a different conductive material. However, the molded body can also consist of an electrically-conductive plastic. The pipette tip can be manufactured by inserting the molded body into an injection molding tool, and at least partially overmolding the molded body with the transparent plastic. Since the body partially consists of transparent plastic, the level in the pipette tip can still be visually inspected.

According to one embodiment, the molded body is exposed at least at the bottom opening and top opening of the body. This ensures that the molded body is wet by a liquid in which the pipette tip is immersed and contacts a pipette that is releasably connected to the pipette tip. According to another embodiment, the molded body between the bottom opening and top opening is completely or partially embedded in the transparent plastic of the body. This allows the molded body to be firmly connected to the pipette tip.

At least one transparent region can be translucent, i.e., only partially transparent such as frosted glass. It can however also be transparent, i.e., completely clear, such as window glass. The transparent region is preferably at least transparent enough to enable the liquid level in the pipette tip to be observed from the outside.

The electrically-conductive region, or printings, or molded body of electrically conductive material can have different geometries. According to one embodiment, it or they are at least partially strip-shaped.

According to another embodiment, the electrically conductive strip is at least 1 mm wide. This is particularly advantageous in the production of tips using a two-component injection molding process since excessive flow resistance is avoided.

According to one embodiment, a plurality of sections of the electrically-conductive regions, or printings, or a plurality of molded bodies are evenly distributed over the perimeter of the body. This can prevent the problematic distribution of stress and distortion of the pipette tip during injection molding. This is particularly advantageous for manufacturing in a two-component injection molding process, but also for printing and molding on or overmolding a molded body.

According to another embodiment, the pipette tip has strip-shaped sections of the electrically-conductive region, or printings, or molded bodies on at least two diametrically opposing sides of the body. In particular, this promotes the secure contacting of the syringe by the pipette.

According to one embodiment, the electrically-conductive region, or printings, or molded body extends to the bottom end and/or to the top end of the body. Extension to the bottom end allows early detection of immersion in liquid. The extension can however also specifically have a certain distance from the bottom end to ensure that the pipette tip is immersed deeply enough in the liquid to withdraw a certain amount of liquid. An extension to the top end of the body promotes the contact between the electrically-conductive region, or printings, or molded body and a dosing device.

According to another embodiment, the electrically-conductive region, or printings, or molded body have at least one ring and/or ring segment that extends in the peripheral direction of the body. By means of the ring and/or the ring segment, sections of the electrically-conductive region spaced from each other in a peripheral direction, or printings spaced from each other, or molded bodies spaced from each other can be connected to each other in an electrically conductive manner. In addition, the contacting of the liquid and/or contact with a dosing device can be ensured depending on the alignment of the pipette tip by means of the ring and/or ring segment. According to another embodiment, a ring and/or ring segment extends around the bottom end and/or around the top end of the pipette tip. The ring and/or ring segment can however also extend at a distance from the bottom end and/or top end of the pipette tip.

The contacting of printings or molded bodies spaced from each other in a peripheral direction can however also be ensured by a suitably designed contact device of the pipette that touches several positions in the peripheral direction. This can for example be a helical spring that is curved in the shape of a ring in the manner of a spiral-type expander spring.

According to another embodiment, the transparent plastic is natural colored polypropylene. According to another embodiment, the electrically-conductive plastic is a polypropylene compound containing conductive carbon black.

The electrically-conductive region can be exclusively arranged on the outside or exclusively on the inside of the pipette tip. It can however also be arranged both on the outside and on the inside of the pipette tip. An electrically conductive coating is preferably arranged on the outside of the pipette tip. When producing the pipette tip in a two-component injection molding process, the electrically-conductive region is preferably a section of the wall the body that extends from the passage up to the outside of the body.

The electrically-conductive region, or the printings, or the molded body preferably has a maximum resistance of 30 kOhm between its distant ends extending the longitudinal direction of the body. Conventional dosing units that work together with electrically conductive pipette tips are designed to work together with electrically conductive pipette tips that have a maximum resistance of 30 kOhm between the bottom end and top end. The pipette tip is preferably designed for such units.

A pipette for using an electrically conductive pipette tip or one of its embodiments preferably has a housing that, at one bottom end, has a seat of a pipette tip in which the through-hole is arranged for air that is connected via a connecting channel arranged in the housing to a displacement device for air arranged in the housing, wherein the seat is assigned a contact for contacting an electrically-conductive region of the pipette tip.

The contact can in particular be a seat for the pipette tip consisting of electrically conductive material. The contact can also be located close to the seat. According to one embodiment, the contact is a spring contact that is elastically deformable by a pipette tip arranged on the seat.

BRIEF DESCRIPTION OF THE SEVERAL VIEWS OF THE DRAWINGS

The invention is explained in more detail hereinafter with reference to the accompanying drawings of exemplary embodiments. The drawings show.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

In the present application, the terms "top" and "bottom" refer to the preferred alignment of the pipette tip during use in which the pipette tip with its body is vertically aligned, and the bottom opening is arranged at the bottom, and the top opening is arranged at the top.

In the following explanation of various exemplary embodiments, the parts identified with the same terms are provided with the same reference numbers, the various exemplary embodiments differing from each other by a subsequent period and different numbers after the period.

Figure 1:
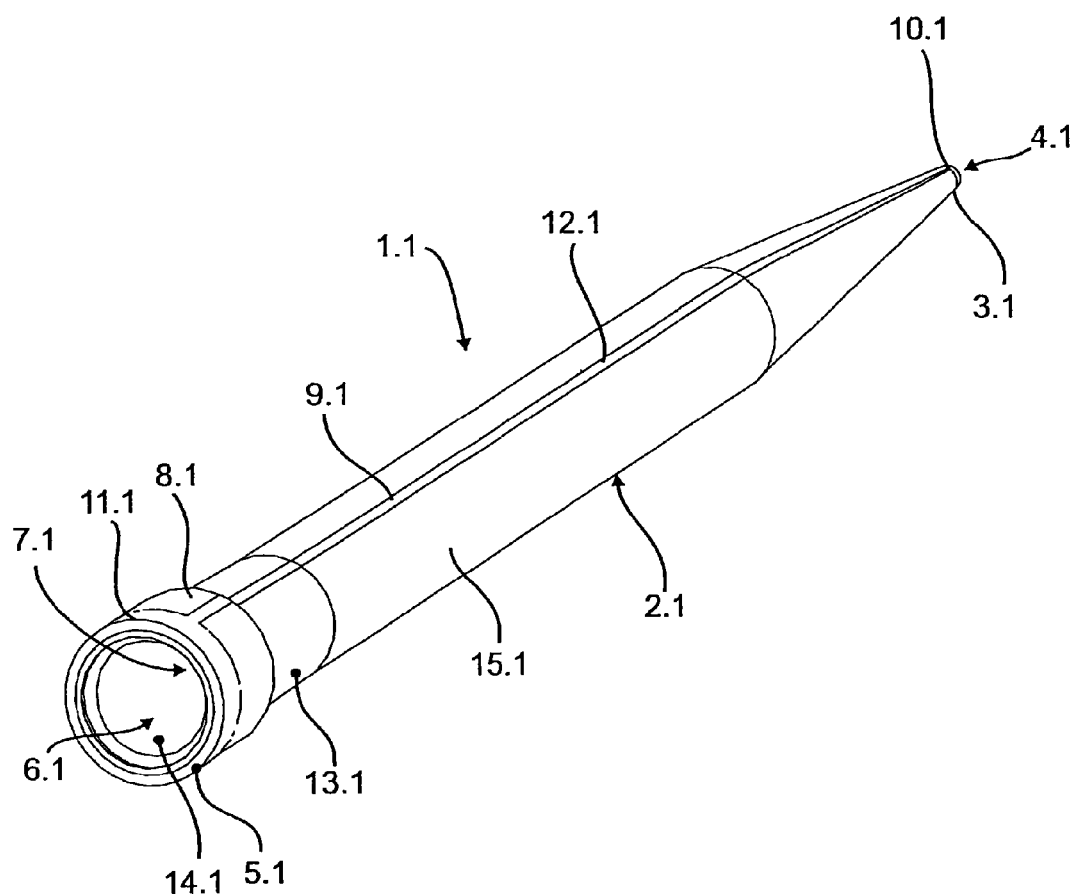
FIG. 1 A perspective view at an angle from the side of a pipette tip manufactured in a two-component injection molding process.

According to FIG. 1, a pipette tip 1.1 manufactured in a two-component injection molding process has a tubular body 2.1 that, at the bottom end 3.1, has a bottom opening 4.1 for the passage of liquid and, at the top end 5.1, has a top opening 6.1 for the passage of air, and a passageway 7.1 between the bottom opening 4.1 and the top opening 6.1.

At the bottom opening 4.1, the pipette tip 1.1 has its smallest cross-section, and it has its largest at the top opening 5.1.

From the bottom opening 4.1 to the top opening 5.1, the cross-section of the pipette tip 1.1 generally increases, and this cross-sectional increase can be gradual and/or in steps. At the top end 5.1, the pipette tip 1.1 has a collar 8.1, that is, a projection that projects radially to the outside.

The body 2.1 of the pipette tip 1.1 has a strip-shaped section 9.1 running in an axial direction from the bottom to the top end of a region consisting of an electrically conductive material. In addition, at both the bottom end 9.1 and at the top end 5.1, it has an annular section 10.1, 11.1 of a region 12.1 consisting of an electrically conductive material. The sections 9.1, 10.1, 11.1 of the electrically-conductive region 12.1 are injected into recesses in the outside 13.1 of the pipette tip 1.1. This enables production in a transfer process in which the syringe body 2.1 with the recesses is first injection molded, then transferred, and then the electrically-conductive region 12.1 is injection molded.

The pipette tip 1.1 is consequently not electrically conductive on the inside 14.1. It can however be contacted by a pipette, for example by pressing a contact onto the front edge of an annular section 11.1 of the conductive region 12.1.

The body 2.1 of the pipette tip 1.1 is for example injection molded from transparent, natural colored polypropylene. In sections 9.1, 10.1, 11.1 of the electrically-conductive region 12.1, it is for example, injection molded from a polypropylene compound containing a conductive carbon black. The remaining regions of the pipette tip 1.1 are transparent regions 15.1 that extend from the passageway 7.1 to the outside 12.1.

This ensures an electrically conductive connection between the bottom end 3.1 and the top end 5.1 of the pipette tip 1.1. Nevertheless, the liquid level in the pipette tip 1.1 can be observed through the transparent regions 14.1 consisting of natural colored PP.

Figure 2:
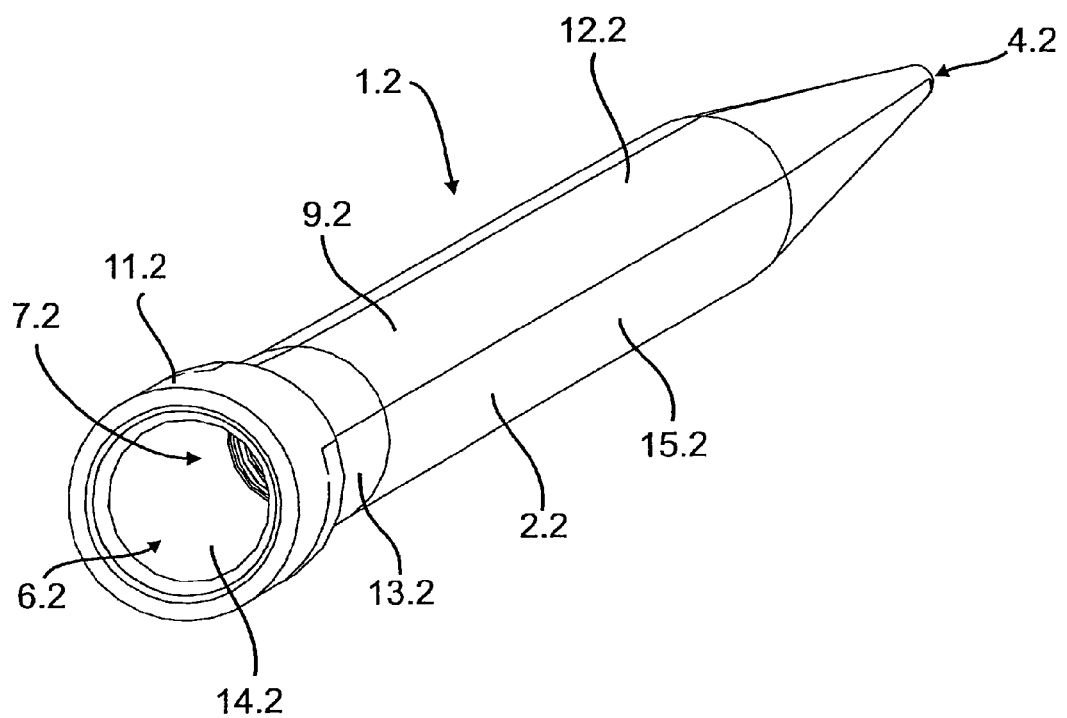
FIG. 2 A perspective view at an angle from the side of another pipette tip manufactured in a two-component injection molding process.
Figure 3:
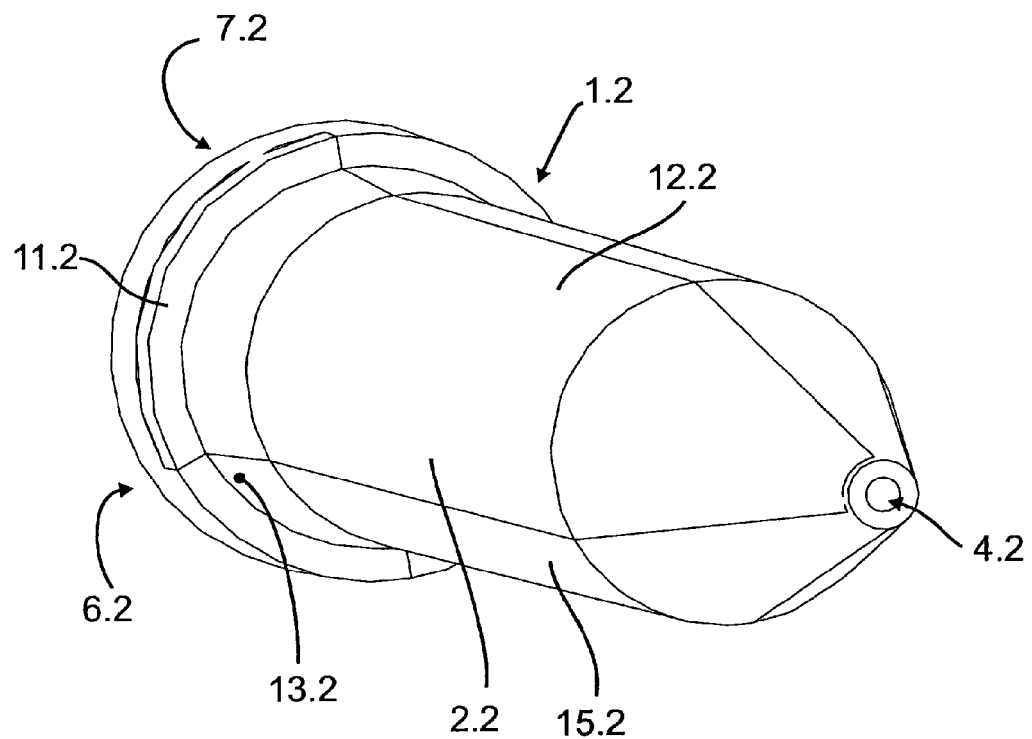
FIG. 3 A bottom view of the same pipette tip.

The pipette tip 1.1 according to FIGS. 2 and 3 differs from the aforementioned in that the strip-shaped section 9.2 is designed wider than section 9.1. At the bottom end, the electrically-conductive region 12.2 does not have an annular section. The annular section 11.2 runs from the outside 13.2 of the pipette tip 1.2 across the edge of the opening 6.2 to the inside 14.2 so that the pipette tip 1.2 can also be contacted by a shoulder consisting of electrically conductive material of a pipette on which it is mounted. In addition, the extension of the annular section 11.2 around the outer edge of the opening 6.2 and the arrangement of the strip-shaped section 9.2 in a groove-like recess ensures that the body 2.2 can be transferred after being injection molded into another mold in which the conductive region 12.2 is injection molded.

Figure 4:
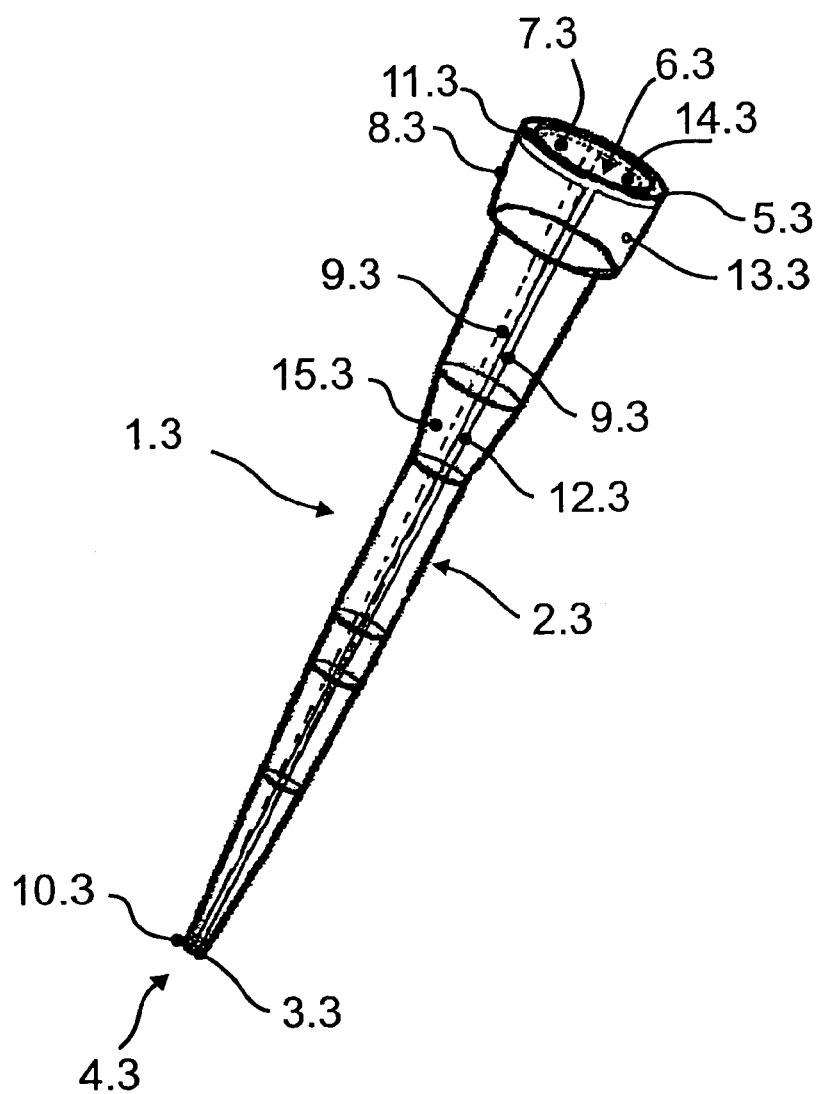
FIG. 4 A perspective view at an angle from the side of a pipette tip provided with a printing of electrically conductive material.

The pipette tip 3.3 in FIG. 4 differs from the aforementioned in that the electrically-conductive regions 9.3, 10.3, 11.3 are formed by electrically conductive printing on the outside of the body 2.3. In addition, the strip-shaped regions 9.3 are at two diametrically opposing positions on the outside 12.3. The other regions of the body 2.3 are transparent regions 14.3, for example consisting of natural colored PP.

Figure 5:
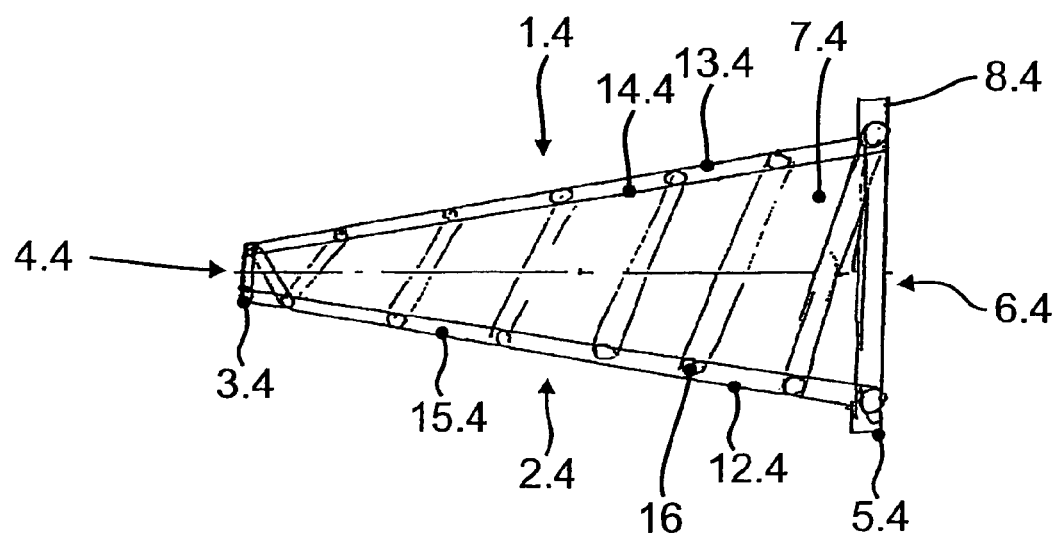
FIG. 5 A lengthwise section of a pipette tip provided with a helical spring.

The pipette tip 1.4 in FIG. 5 has a body 2.4 that comprises a helical spring 16 consisting of spring steel that is partially over-molded by a transparent plastic such as natural colored PP, and that forms the electrically-conductive region. The helical spring 15 extends from the bottom end 3.4 to the top end 5.4 and is exposed at least at the bottom end 3.4 and at the top end 5.4 to ensure contact. The liquid level can be observed in the passageway 7.4 within the pipette tip 1.4 through the transparent regions 15.4 between the windings of the helical spring 16.

This completes the description of the preferred and alternate embodiments of the invention. Those skilled in the art may recognize other equivalents to the specific embodiment described herein which equivalents are intended to be encompassed by the claims attached hereto.

The invention claimed is:

1. An electrically conductive pipette tip having an elongated, tubular body (2) that has a bottom opening (4) at the bottom end (3) for the passage of liquid, and a top opening (6) at the top end (5) for the passage of air, and a passageway (7) between the bottom opening (3) and top opening (4), wherein the body (2) has a continuous, electrically conductive region (9 to 11) extending in the longitudinal direction of the tubular body (2) consisting of an electrically conductive first plastic component, wherein the electrically conductive region (9 to 11) comprises at least a ring (10, 11) that extends in the peripheral direction around the top end (4) and around the bottom end (3) of the body (2), and has at least one transparent or translucent region (15) consisting of another plastic component that extends from the passageway (7) to the outside (13) of the body (2), and the body is manufactured in a multi-component injection molding process.

2. An electrically conductive pipette tip according to claim 1, wherein the electrically conductive region (9 to 11) comprises a strip-shaped region (9).

3. The electrically conductive pipette tip of claim 1 wherein said body (2) consists of transparent or translucent plastic and at least one molded body (16) of electrically conductive material, and the molded body (16) is at least partially over-molded with the transparent or translucent plastic within an injection mold.

4. The pipette tip according to claim 1, wherein the electrically conductive region (9 to 11) is at least partially strip-shaped.

5. The pipette tip according to claim 4, wherein the strip-shaped region is at least 1 mm wide.

6. The pipette tip according to claim 1, wherein the electrically conductive region extends to the bottom end (3) and/or the top end (4) of the body (2).

7. The pipette tip according to claim 1, wherein the ring (10, 11) and/or the ring segment connects different sections of the electrically conductive region (9 to 11) extending from each other in the peripheral direction of the body (2).

8. The pipette tip according to claim 1, wherein the transparent or translucent plastic is natural colored polypropylene, and/or wherein the electrically conductive plastic is a polypropylene compound containing a conductive carbon black.

9. The pipette tip according to claim 1 which has the electrically conductive region on the outside (13) and/or on the inside (14).

10. An electrically conductive pipette tip having an elongated, tubular body (2) that has a bottom opening (4) at the bottom end (3) for the passage of liquid, and a top opening (6) at the top end (5) for the passage of air, and a passageway (7) between the bottom opening (3) and top opening (4), wherein a plurality of printings (12.3) extending in the longitudinal direction of the body consisting of electrically conductive material are arranged on the body (2), wherein the printings (12.3) comprise at least one ring (10, 11) that extends in the peripheral direction around the top end (4) of the body (2), and the body has between the printings transparent or translucent regions (15) consisting of plastic that extend from the passageway (7) to the outside (13) of the body (2).

11. The pipette tip according to claim 10, wherein the printings (12.3) are at least partially applied in the form of graduation and/or lettering and/or a barcode and/or another machine-readable code.

12. The pipette tip according to claim 10, wherein the printings (12.3) are evenly distributed over the perimeter of the body.

13. The pipette tip according to claim 12 that has at least two electrically printings (12.3) at diametrically opposing sides of the body (7).

14. The pipette tip according to claim 10, wherein the printings (12.3) comprise at least one ring (10) and/or a ring segment that extends in the peripheral direction around the bottom end (3) of the body (2).

15. The pipette tip according to claim 10, wherein the printings (12.3) are at least partially strip-shaped.

16. The pipette tip according to claim 15, wherein the strip-shaped printings (12.3) are at least 1 mm wide.

17. The pipette tip according to claim 10, wherein the printings (12.3) are evenly distributed over the perimeter of the body.

18. The pipette tip according to claim 17 that has at least two electrically printings (12.3) at diametrically opposing sides of the body (7).

19. An electrically conductive pipette tip having an elongated, tubular body (2) that has a bottom opening (4) at the bottom end (3) for the passage of liquid, and a top opening (6) at the top end (5) for the passage of air, and a passageway (7) between the bottom opening (3) and top opening (4), wherein said body (2) consists of transparent or translucent plastic and at least one molded body (16) of electrically conductive material connected thereto, wherein the molded body (16) comprises at least one ring (10, 11) that extends in the peripheral direction around the top end (4) and/or the bottom end (3) of the body (2), and is inserted in the injection mold, and is at least partially over-molded with the transparent or translucent plastic, wherein the molded body (16) is a helical spring.

20. An electrically conductive pipette tip having an elongated, tubular body (2) that has a bottom opening (4) at the bottom end (3) for the passage of liquid, and a top opening (6) at the top end (5) for the passage of air, and a passageway (7) between the bottom opening (3) and top opening (4), wherein said body (2) consists of transparent or translucent plastic and at least one molded body (16) of electrically conductive material connected thereto, wherein the molded body (16) comprises at least one ring (10, 11) and/or a ring segment that extends in the peripheral direction around the top end (4) and/or the bottom end (3) of the body (2), and wherein the molded body (16) is a helical spring and is inserted in the injection mold, and is at least partially over-molded with the transparent or translucent plastic.

* * * * *